July 15, 1941.   M. A. WECKERLY   2,249,368
WEIGHING SCALE
Filed Nov. 30, 1936   2 Sheets-Sheet 1
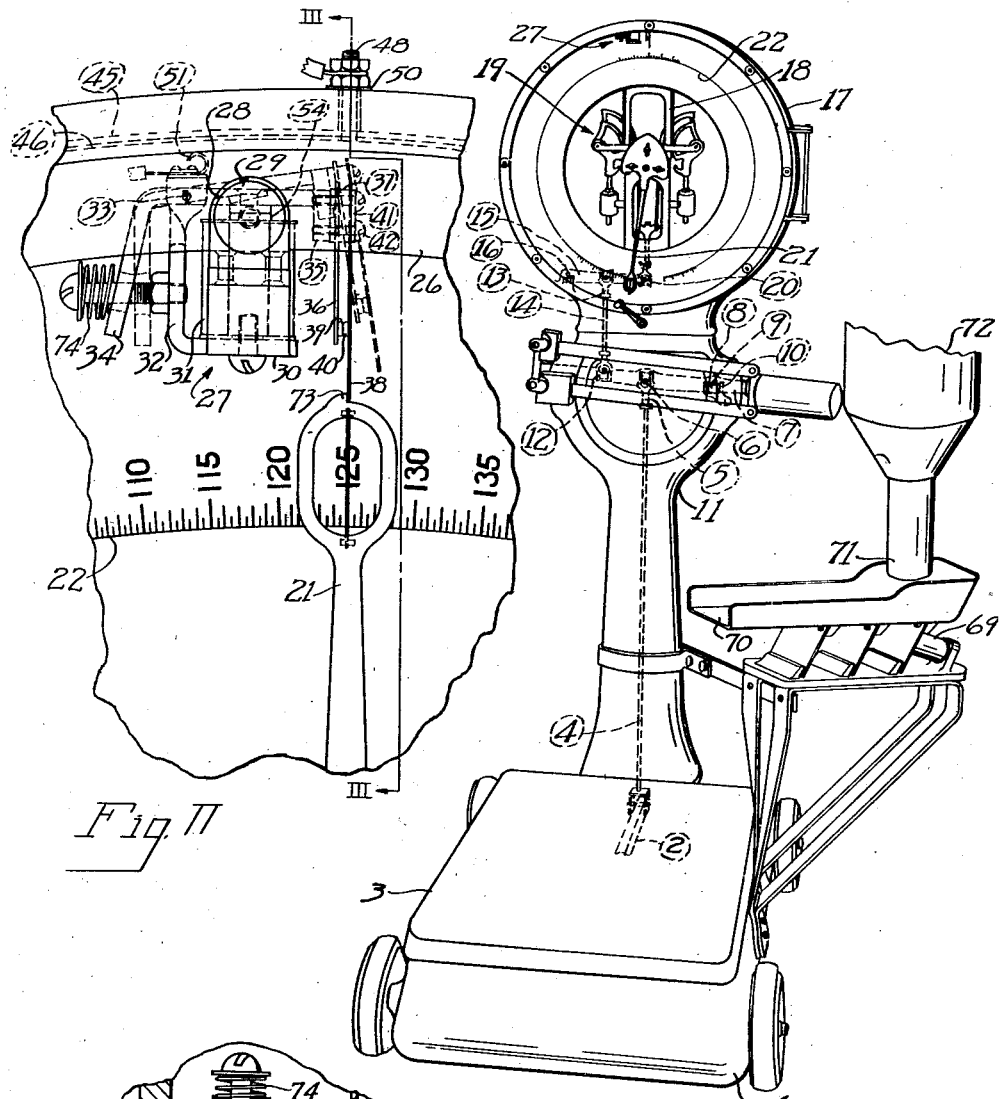
Fig. II
Fig. I
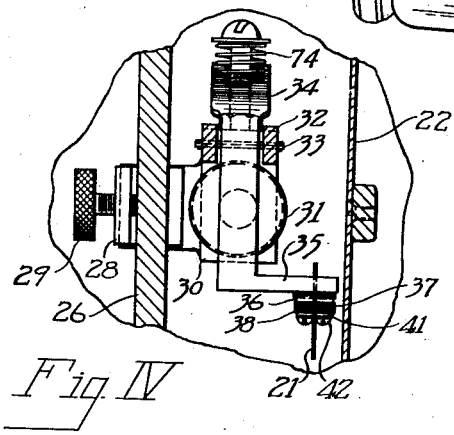
Fig. IV
Mark A. Weckerly
INVENTOR
BY
ATTORNEY

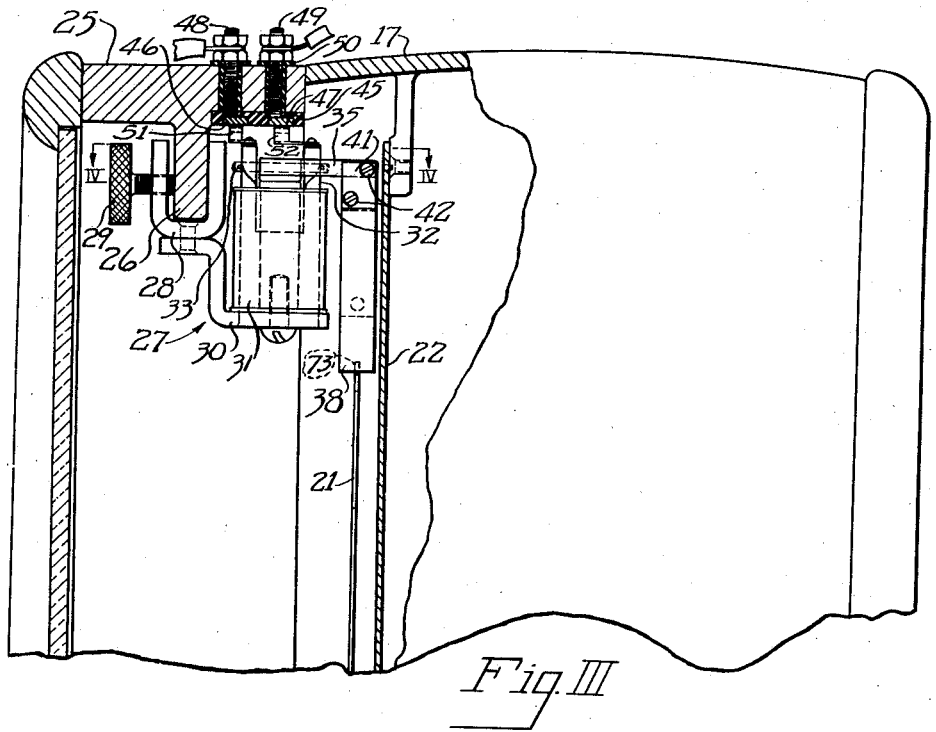
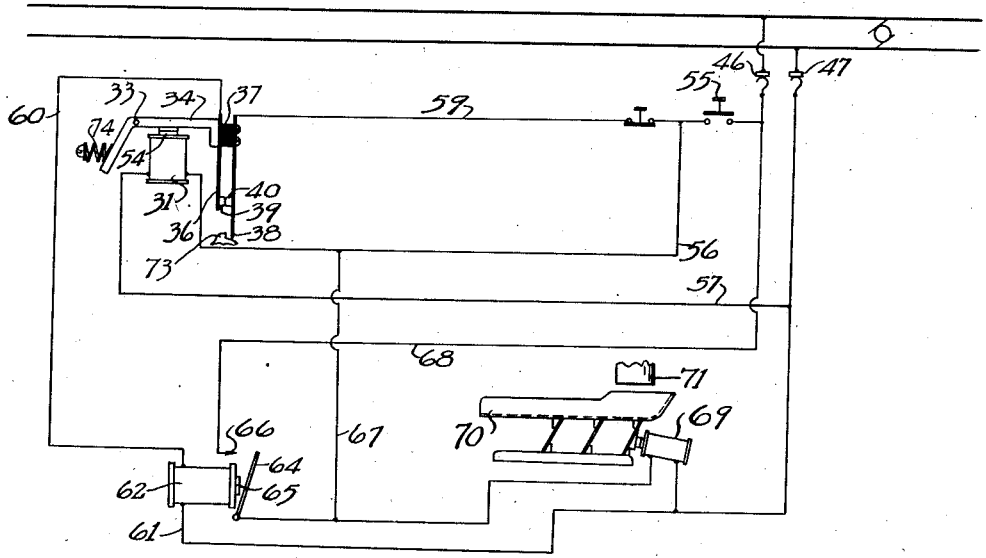

Patented July 15, 1941

2,249,368

UNITED STATES PATENT OFFICE 2,249,368

WEIGHING SCALE

Mark A. Weckerly, Toledo, Ohio, assignor to Toledo Scale Company, Toledo, Ohio, a corporation of New Jersey Application November 30, 1936, Serial No. 113,322

2 Claims. (Cl. 200—56)

This invention relates to weighing scales, and more particularly to scales which are adapted to automatically determine when sufficient material has been deposited on the load receiver and then to cut off the delivery of such material. Electrical switches employed in scales of this type to open and/or close a circuit which controls the material delivery and which depend upon the physical contact of two relatively movable scale members are not very desirable, since after the scale member has closed or opened such switch, it remains in engagement therewith. Although switches of this type are delicately and accurately made to reduce their influence on weighing mechanisms to a minimum, some reactive influences, however, are imparted to the weighing mechanism.

The principal object of my invention is the provision of an improved scale switch for the purpose described, which upon opening or closing a circuit by the physical contact of a scale member, automatically moves out of the path of said scale member.

Another object of the invention is the provision of a scale switch having metallic spring ribbon contacts which, per se, offer no substantial resistance to a scale indicator.

Another object of the invention is the provision of a scale switch which is adapted to be engaged by a moving member of the scale to control the material feed and to automatically and instantaneously move out of the path of said movable scale member.

Still another object is the provision of improved means whereby a scale switch for controlling the material feed may be manually set to intercept a moving scale part to determine varying predetermined amounts of material.

A further object is the provision of improved means for supplying electric current to a manually settable scale cut-off switch.

These, and other objects and advantages will be apparent from the following description in which reference is had to the accompanying drawings wherein similar reference numerals refer to similar parts throughout the several views.

Referring to the drawings—

Figure I is a front elevational view of a scale and the material feeding mechanism controlled by the object of my invention.

Figure II is an enlarged front elevational view of the control switch.

Figure III is an enlarged sectional view through the scale housing along the line III—III of Figure II, showing the control switch in detail.

Figure IV is a sectional plan view of the control switch, the section being along the line IV—IV of Figure III; and, Figure V is a diagram of the electrical circuit.

Referring to the drawings in detail:

The scale is described in detail only so far as is necessary to show its cooperation with the object of my invention. However, I refer to U. S. Patent No. 1,543,768 to H. O. Hem, which describes the type of scale shown in greater detail.

A base 1 houses lever mechanism 2 which supports a load receiver 3 in the usual manner. The load transmission pivot, of the lever mechanism, engages a connecting rod 4 whose upper end engages a stirrup 5 suspended from a load pivot 6 of an intermediate lever 7. This lever 7 is oscillatably supported on a bearing 8 by means of a fulcrum pivot 9. This bearing 8 is fixed in a bracket 10 situated in the interior of a hollow column 11. With the aid of suitable stirrups 12 and 13 the lever 7 is connected by a connecting rod 14 to a pendulum lever 15, fulcrumed at 16 on a suitable bearing in the interior of a substantially watchcase-shaped housing 17 which surmounts the column 11. From a frame 18, which is perpendicularly mounted within this housing 17, a load offsetting pendulum mechanism 19 is suspended by means of flexible ribbons in the known manner. Other ribbons which are connected to this pendulum mechanism are connected to a power pivot 20 of the pendulum lever 15, and suitable means are provided whereby an indicator 21, rotatably mounted in the housing, is moved by the pendulum mechanism through an angle whose magnitude is directly proportional to the weight of a load on the platform. This indicator 21 cooperates with a chart 22 on which a series of weight indicia are printed to visually indicate and evaluate the weight of a load on the platform.

Since it is desirable to be able to change any scale, of the type described or of any other suitable type, so that it may be employed to automatically determine amounts of load placed on its load receiver by means of a suitable conveying system, I have assembled my improved control means on an annular member 25 which is attachable to the front edge of the housing 17 of any scale of this type. This member 25, which serves to extend the front edge of the housing 17, is provided with an inwardly directed flange 26 to which a "cut-off" switch 27 may be clamped, in an infinite number of positions so that the material being weighed can be cut off at any desired amount.

This switch 27 comprises a U shaped member 28 adapted to be clamped to the flange 26 by means of the thumb screw 29. On a shelf-like member 30 which is riveted to the clamp 28, an electro-magnet 31 is fastened. Upwardly extending arms 32 (Fig. II) at one side of the shelf-like member 30 support a pintle 33 on which an armature 34 is fulcrumed. This armature extends over the core of the electro-magnet 31, and, to a portion 35 which extends laterally (Fig. IV) a switch blade 36 is dependingly fastened, although electrically insulated therefrom. A spacer 37 of dielectric material serves to support a second switch blade 38. The blades 36 and 38 are provided with contact "points" 39 and 40 respectively, which are normally in engagement. A dielectric washer 41, dielectric bushings (not shown) and screws 42 serve to fix the switch blades to the armature 34. The portion 35 of the armature 34 is offset so that when the switch is clamped to the flange 26 the blade 38 extends directly into the path of the indicator 21. Since the switch 27 may be clamped in an infinite number of positions on the periphery of the flange 26, means are provided for conveying current to the electro-magnet 31. These means comprise an annulus 45, made of fiber, or other dielectric material, and set into a groove machined in the extension 25. In grooves, machined into the annulus 45, contact strips 46 and 47 are fixed. Binding posts 48 and 49 in contact with the strips and extending through the dielectric washers and bushings 50, are adapted to energize the contact strips. Wipers 51 and 52, which are fastened to but insulated from the arms 32 of the shelf-like member 30, engage the contact strips 46 and 47 and serve to carry electric current to the winding of the electro-magnet 31.

When it is desired to fill similar containers with, for example, 50 lbs. of material, the container is placed upon the platform or load receiver 3 and its weight is offset by moving a poise on a tare beam in the usual manner, so that the indicator 21 points to the zero indicium on the chart when the container is empty. The switch 27 is then moved along the flange 26 of the housing extension member 25 until the blade 38, when the switch is closed, is located so that when the indicator 21 points to the indicium representing the desired weight, in this case 50, its contact point 40 is just disengaging from the contact point 39 under the influence of the indication. The switch 27 may be provided with an indicator to cooperate with the indicia on the chart to determine its correct location, I have found, however, that it is more satisfactory to set it empirically, that is by shifting it along the flange until it is tripped at the point when the correct amount of material has been delivered.

Referring now to Figure V. To place the electric circuit in operating condition the normally open push button 55 is depressed, closing the circuit and current flows from the power source through contacts 46 and 47, the leads 56 and 57 to the electro-magnet 31, which is energized. Current also flows through the lead 59, contacts 39 and 40, leads 60 and 61 to a coil 62. When the electro-magnet 31 is energized the armature 34 is attracted by the core 54 of the electro-magnet 31 and the switch, comprising the blades 36 and 38, is drawn into the path of the indicator 21. When coil 62 is energized its armature 64 is drawn against core 65 of coil 62 and this armature engages contact 66 permitting current to flow through the lead 67 and 68 "sealing" around the normally open push button 55 and keeping coils 31 and 62 energized after the push button 55 has been released, and also simultaneously energizing a reciprocating motor 69 of a vibrating material feed chute 70, which is placed directly below spout 71 of a supply hopper 72. The reciprocating chute, which is well known in the art, when energized will feed material so that it falls into the container standing on the load receiver 3 of the scale. The increasing weight of the material dropping into this container overbalances the load counterbalancing pendulum mechanism 19 and the pendulums in the known manner move outwardly and upwardly with the increasing weight moment of the load, the indicator being operatively connected to the pendulums visualizes this increasing weight. When the desired amount has been deposited in the container the tip 73 of indicator 21 just contacts the end of the ribbon switch blade 38 and breaks the circuit of the current which flows through the blade 38, contacts 39 and 40 and the blade 36. This instantaneously deenergizes the electromagnet 31 and the armature 34 swings about its pintle fulcrum 33, due to the bias of spring 74 provided for this purpose. This movement of the armature carries the switch blade 38 out of the path of the indicator, as indicated by the dotted lines in Fig. II, so that the position of the indicator is not effected by any influence except the weight of the load. When the circuit is broken by disengagement of the contacts 39 and 40, coil 62 is deenergized permitting the armature 64 to leave the contact 66 and thus deenergize the reciprocating motor 69 stopping the flow of material from the hopper 72 over the vibrating feeding chute. While in this embodiment of the invention the material feed is depicted as the vibrating chute, energized by a reciprocating motor, other material feeding devices may be substituted, for example, a rotary motor driving a screw conveyor, or the embodiment of the invention may be employed to control other mechanisms.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, an element connected to weighing mechanism and movable thereby along a definite path, a circuit controlling switch having a projecting member, electromagnetic means for holding said projecting member in the path of movement of said element, spring means for withdrawing said projecting member from the path of said element, whereby said switch deenergizes said electromagnetic means upon engagement of said element with said projecting member, and interference of said projecting member with movement of said element instantly is relieved.

2. In a device of the class described, in combination, an element movable by weighing mechanism along a definite path, a normally closed switch, a member projecting into the path of movement of said element and adapted to open said switch when engaged by said element, electromagnetic means for holding said projecting member in the path of movement of said element, spring means for withdrawing said projecting member from the path of movement of said element, whereby said electromagnetic means is energized when said switch is closed and deenergized when said switch is open, and interference of said projecting member with movement of said element instantly is relieved when said switch is opened.

MARK A. WECKERLY.